United States Patent [19]

Jones

[11] Patent Number: 5,082,308
[45] Date of Patent: Jan. 21, 1992

[54] VEHICLE SUSPENSION DEVICE
[75] Inventor: Neil Jones, Palm City, Fla.
[73] Assignee: Group Lotus PLC of Norwich, Norfolk, United Kingdom
[21] Appl. No.: 441,828
[22] Filed: Nov. 27, 1989
[30] Foreign Application Priority Data Nov. 28, 1988 [GB] United Kingdom ............... 8827745

[51] Int. Cl.⁵ ............................................. B60G 17/015
[52] U.S. Cl. ..................................... 280/707; 280/714
[58] Field of Search ...................... 280/6.12, 702, 708, 280/707, 714, 6.1, 840

[56] References Cited

U.S. PATENT DOCUMENTS

| 3,482,855 | 12/1969 | Capgras. | |
|---|---|---|---|
| 3,492,013 | 1/1970 | Allen et al. | 280/6 |
| 4,655,440 | 4/1987 | Eckert | 267/64.11 |
| 4,804,111 | 6/1989 | Garnjost | 91/436 |

FOREIGN PATENT DOCUMENTS

| 3638574 | 5/1988 | Fed. Rep. of Germany | 280/714 |
|---|---|---|---|
| 2562843 | 4/1985 | France. | |
| 41224 | 2/1988 | Japan | 280/707 |

Primary Examiner—Charles A. Marmor
Assistant Examiner—Karin Tyson
Attorney, Agent, or Firm—Fulwider, Patton, Lee & Utecht

[57] ABSTRACT

An active vehicle suspension includes a strut comprising a piston working in a cylinder and movable to compensate for unexpected road inputs to the suspension and for inputs generated by the driver, such an inertial force introduced by braking or cornering. At times when the piston is being moved by the road and driver inputs to compress the strut excess hydraulic fluid is fed from the strut to an accumulator where it is temporarily stored at high pressure and later released back to the strut when it is desired to increase the length of strut. Thus some, and sometimes all, of the energy needed to extend the strut can be supplied by the accumulator rather than a pump. This save energy. The piston has unequal areas and a system of spool valves is provided to control the flow of fluid between the strut, accumulator, and pump.

10 Claims, 4 Drawing Sheets

VEHICLE SUSPENSION DEVICE

This invention relates to a vehicle suspension device.

In particular, the invention relates to a combined actuator and damper for a vehicle suspension system of the kind in which the actuator is positioned between the vehicle hub and the sprung mass of the vehicle and the position of the sprung mass relative to the hub is determined or assisted by the actuator. The actuator may be used in parallel with the normal vehicle road spring or in exceptional circumstances may completely replace the vehicle road spring. Such systems are now well known.

The prior art includes a strut in the form of a double acting piston and cylinder device where hydraulic fluid is fed to either side of the piston by a control valve and exhausted from the other side of the piston depending upon a desired relative movement between the vehicle hub and the sprung mass. When included in a vehicle suspension control system including control means and a suitable hydraulic circuit, such a strut forms an essential element of what is known in the art as an "active suspension system".

It has been proposed, in order to conserve energy in such devices, that the two sides of the piston can be hydraulically connected together at will so that if the relative movement of the hub and the sprung mass is such as to aid the desired movement of the piston no energy needs to be put into the piston and cylinder assembly from the supply of pressurised fluid.

However, to date this has only been possible in pistons where the areas on both sides of the piston have been equal as otherwise it would not be possible for fluid to flow from one side of the piston to the other when the two sides of the piston are hydraulically interconnected. This has resulted in complications in piston design which are undesirable in practice.

According to a first aspect of the invention, there is provided a vehicle suspension device comprising a piston and cylinder arrangement included in a fluid control circuit, a first surface of the piston acting in a first chamber of the cylinder being of smaller area than a second surface of the piston acting in a second chamber of the cylinder, wherein said first chamber is connected via fluid connection means to a source of pressurised fluid and said second chamber is selectively connectable via fluid connection means to one or more of a source of pressurised fluid, an accumulator of pressurised fluid and an exhaust for pressurised fluid.

Preferably, the vehicle suspension includes an actuator rod secured to the first surface of the piston, which actuator rod extends longitudinally along the first chamber through an aperture in a wall thereof externally of the cylinder to interconnect the piston and an object supported on the suspension device, thereby forming the reduced area of the first surface of the piston in comparison with the second surface thereof.

It is further preferable that the piston and cylinder arrangement interconnects the sprung mass of a motor vehicle and a road wheel hub assembly thereof.

According to a second aspect of the invention, there is provided a vehicle suspension system including a vehicle suspension device as hereinbefore defined. Preferably the vehicle suspension system includes transducers and/or sensors for detecting the operating characteristics of the vehicle suspension device and for detecting the static and dynamic characteristics of the vehicle, and further includes an on-board computer for processing the detected characteristics and operating the vehicle suspension device accordingly.

It is therefore an advantage of the invention to include an energy saving system whereby a piston having unequal areas on both sides can be actuated either by a supply of fluid under pressure being fed to one side of the piston or the other or, alternatively, where it is possible to conserve energy because of the assistance provided by the relative movement between the vehicle hub and the sprung mass, to provide connections to the two sides of the piston whereby fluid from the pressurised supply need only be used when the aiding movement of the hub and the sprung mass is not sufficient to induce the desired movement of the piston.

To this end the two unequal area sides of the piston are connectable to the system pressure and an accumulator and valve means is used to operate under command to achieve the desired result.

It is preferred that the larger area of the piston is the upper side in use and the system pressure is fed to the lower side of the piston.

A specific example of an improved combined actuator and damper incorporated in a vehicle suspension system, and according to the invention, will now be described with reference to the accompanying drawings of which:

Figure 1:
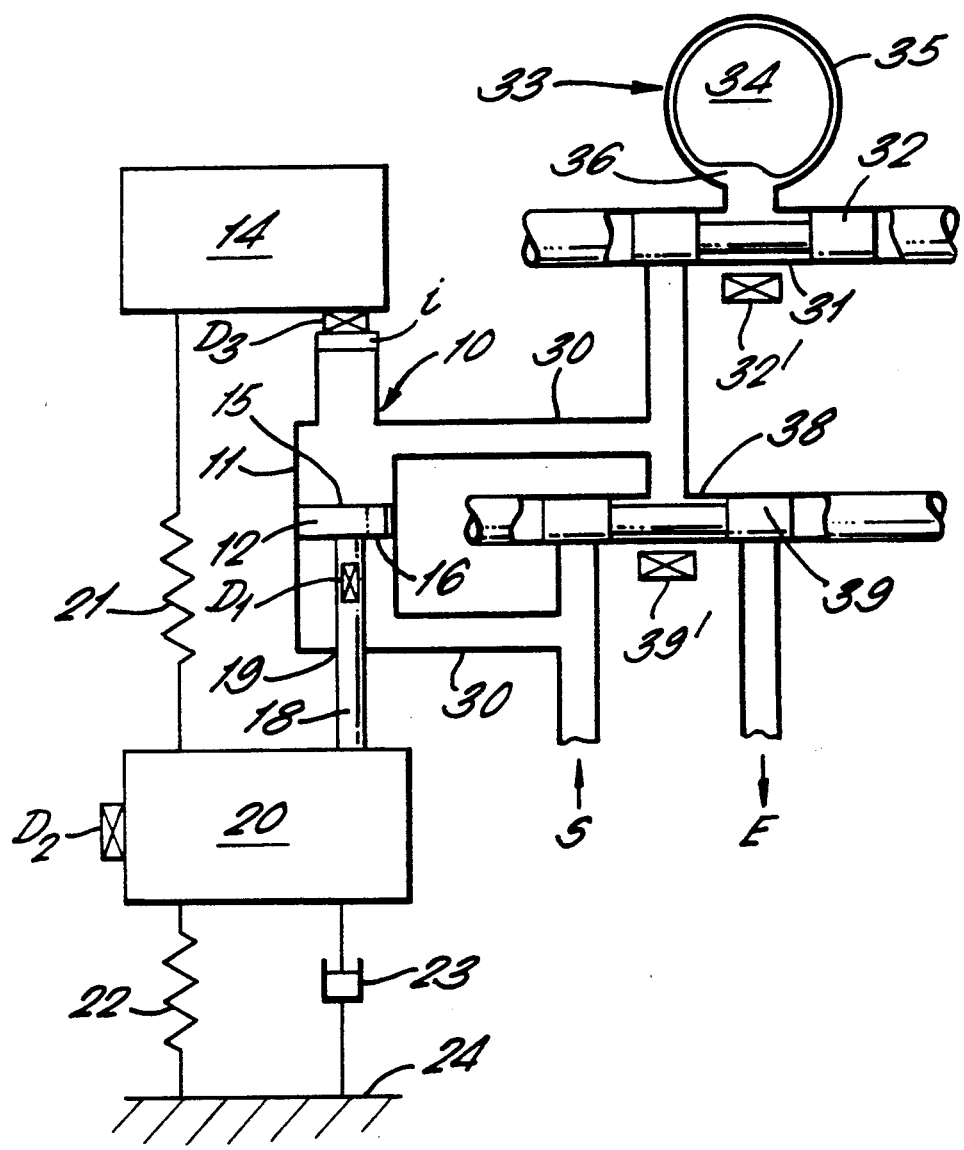
FIG. 1 is a diagrammatic view of one wheel assembly of the suspension system.

Referring FIG. 1, there is shown a vehicle suspension device formed as a piston and cylinder arrangement 10 comprising a cylinder 11 and a double-acting piston 12. The cylinder 11 is aligned generally vertically and is connected at its upper end via an isolator and a load cell i and D3 to the sprung mass 14 of a road vehicle.

The piston 12 has two working surfaces 15 and 16 against which fluid pressure may act and the upper surface 15 is of larger area than the lower surface 16. This is due to the presence of a downwardly-extending actuator rod 18 rigidly secured on the lower surface 16 of piston 12 and extending externally of cylinder 11 via an aperture 19. The area of surface 16 is half that of surface 15.

Actuator rod 18 is rigidly secured to road wheel hub assembly 20 and suspension device 10 therefore acts as a strut interconnecting sprung mass 14 and hub assembly 20. A normal road spring 21 is also shown schematically in FIG. 1 interconnecting the sprung mass 14 and hub assembly 20, in parallel with suspension device 10.

The tyre of the road wheel of hub assembly 20 is shown in FIG. 1 schematically as a parallel spring 22 and dashpot 23 representing the elastic and damping characteristics of the tyre. The tyre is supported on a road surface 24.

The upper end of cylinder 11 is fluidly connected via suitable pipework 30 to a spool valve 31 having a spool 32. Spool valve 31 is arranged to act as an on-off valve, selectively permitting fluid interconnection of the upper side of cylinder 11 and a compressible accumulator 33 for pressurised fluid. The accumulator 33 includes a deformable, sealed member 34 such as a gas bag enclosed within a rigid outer container 35. Clearly, when pressurised fluid such as hydraulic oil enters the accumulator 33 via spool valve 31, the deformable member 34 deforms within the container 35 until a pressure equilibrium exists between the pressurised fluid and the interior of the deformable member. The pressurised fluid occupies the space 36, which is enlarged by deformation of the deformable member 34. The accumulator 33 thus stores the pressure energy in the fluid until some time when a pressure lower than that of the pressurised fluid in space 36 exists on the opposite side of spool valve 31 to that of accumulator 38 and the valve 33 is opened. The excess pressure in the deformable member then drives the fluid stored in space 36 back through valve 31, the deformable member expanding to occupy a larger volume within rigid container 35 as this takes place.

The lower end of cylinder 11 is permanently connected via suitable pipework 30 to a source of pressurised fluid indicated by the arrow S in FIG. 1. In the embodiment described, the suspension device operates using hydraulic oil, so the source of pressurised fluid is a pump P, shown in FIG. 2. However, it is clear that a similar vehicle suspension device can be devised which operates using compressed gas, in which case the source of pressurised fluid would be a compressor.

The source S of pressurised fluid is selectively connectable, via a three-port two-way spool valve 38 having spool 39, to the upper side of cylinder 11 and the inlet of spool valve 31.

The upper side 15 of cylinder 11 and, if required, accumulator 33, may also be selectively connected to an exhaust indicated by the arrow E in FIG. 1. Since the fluid control circuit shown in FIG. 1 is an hydraulic circuit, the exhaust E may be the input side of a suitable pressurising pump or a sump.

The spool valves 31, 38 are shown closed in FIG. 1 for clarity, but this does not necessarily represent an operative state of the system. However, FIG. 1 does clearly show that the lower surface 16 of piston 12 is permanently connected to a supply of pressurised hydraulic fluid. Means for moving the spool valve 39 is schematically indicated at 39' and may be a solenoid.

If the valve spool 39 is moved to the left in FIG. 1, the upper surface 15 of piston 12 is also connected to the source of pressurised hydraulic fluid S while, due to the spool valve action, the exhaust port E remains closed. The net pressure force on piston 12 thus causes it to move downwardly with respect to the cylinder 11, because the area 15 is bigger than the area 16.

Movement of valve spool 39 to the right in FIG. 1 similarly opens the exhaust port E and disconnects the upper surface 15 of the piston from the supply S, resulting in a net upward pressure force acting on piston 12 and causing it to move upwardly within cylinder 11.

Clearly the circuit provides a means of controlling the relative positions of the sprung mass 14 and the roadwheel hub 20, and when suitable transducers and detectors (referred as D1, D2, D3) are included to sense (or allow to be calculated) the relative position of the piston 12, the roadwheel hub assembly 20 and the sprung mass 14, the device can operate under the command of an on-board computer C (shown in FIG. 2) to provide a rapidly responsive system. The transducers and/or detectors send signals d1, d2, d3 to the computer which generates a demanded position of the piston 12 required to provide a required relative movement of the sprung mass and roadwheel hub assembly. Once it has calculated the demanded position of the piston 12 the computer sends a control signal c to means 39' to control the position of the valve appropriately.

During operation of a vehicle suspension system a variety of dynamic situations may arise, including the case where the relative movement of the sprung mass 14 and the roadwheel hub assembly 20 tends to aid the movement of the piston 12 towards a demanded position calculated by the computer. Such a situation may arise, for example, when the roadwheel encounters a bump in the road surface 24 when the vehicle is travelling at speed. As the roadwheel hub assembly 20 rises to pass over the bump, the piston 12 is required to rise within cylinder 11 in order to minimise the perturbation experienced by the sprung mass 14 of the vehicle. Clearly under this circumstance, the relative movement of the roadwheel hub assembly 20 and the sprung mass 14 assists the movement of the piston 12 in attaining its demanded position.

In previous vehicle suspension devices of the kind described above, the excess energy available from the action of the roadwheel hub assembly 20 rising over a bump would be lost since any such excess energy could not be stored but would have to be exhausted via spool valve 38 to exhaust E.

However, in the device of FIG. 1 an accumulator 33 for pressurised fluid is provided, and this may be selectively connected to the upper side 15 of piston 12 via spool valve 31, which is arranged to act as an on-off valve for the connection between accumulator 33 and the upper side 15 of piston 12.

Thus, when the relative movement of the roadwheel hub assembly 20 and sprung mass 14 is acting to assist the piston 11 to attain a demanded position, any excess hydraulic energy in the hydraulic fluid on the upper side of piston 12 may be accumulated in accumulator 33 by valve spool 32 moving to the left under the command of the computer to open the connection between upper side 15 and space 36. Spool 32 moves to the right to close the connection and thus store the hydraulic energy when the computer detects that it is no longer required for the connection to be open. This may occur when, for example, the accumulator 33 is charged to capacity with hydraulic fluid, in which case any further excess fluid, and hence further excess hydraulic energy, may be exhausted via spool valve 38 and exhaust E.

When the suspension device subsequently encounters a situation where it is required to have a net downward force on piston 12, for example under some circumstances when the road wheel negotiates a dip in the road surface, the stored hydraulic energy in the accumulator 33 may be used, on opening of spool valve 31 to interconnect space 36 and the upper side 15 of piston 12, to assist the downward movement of the piston 12.

Whilst the two examples of operation of the device as described above are relatively simple situations when compared with the range and complexity of static and dynamic forces experienced by a road vehicle suspension device during normal motion and manoeuvering, it is clear that a significant reduction of the energy required by the device is made in comparison with the energy requirement of a conventional active suspension device. This is because the excess energy available during certain operations of the device is stored until it is subsequently required during certain other operations of the device.

Furthermore, the upper 15 and lower 16 sides of the piston 12 may be hydraulically interconnected at will via spool valve 38 despite the fact that the areas of the respective piston sides are different, since the accumulator 33 may be used to store and supply hydraulic fluid as required during movement of the piston 12.

Figure 2:
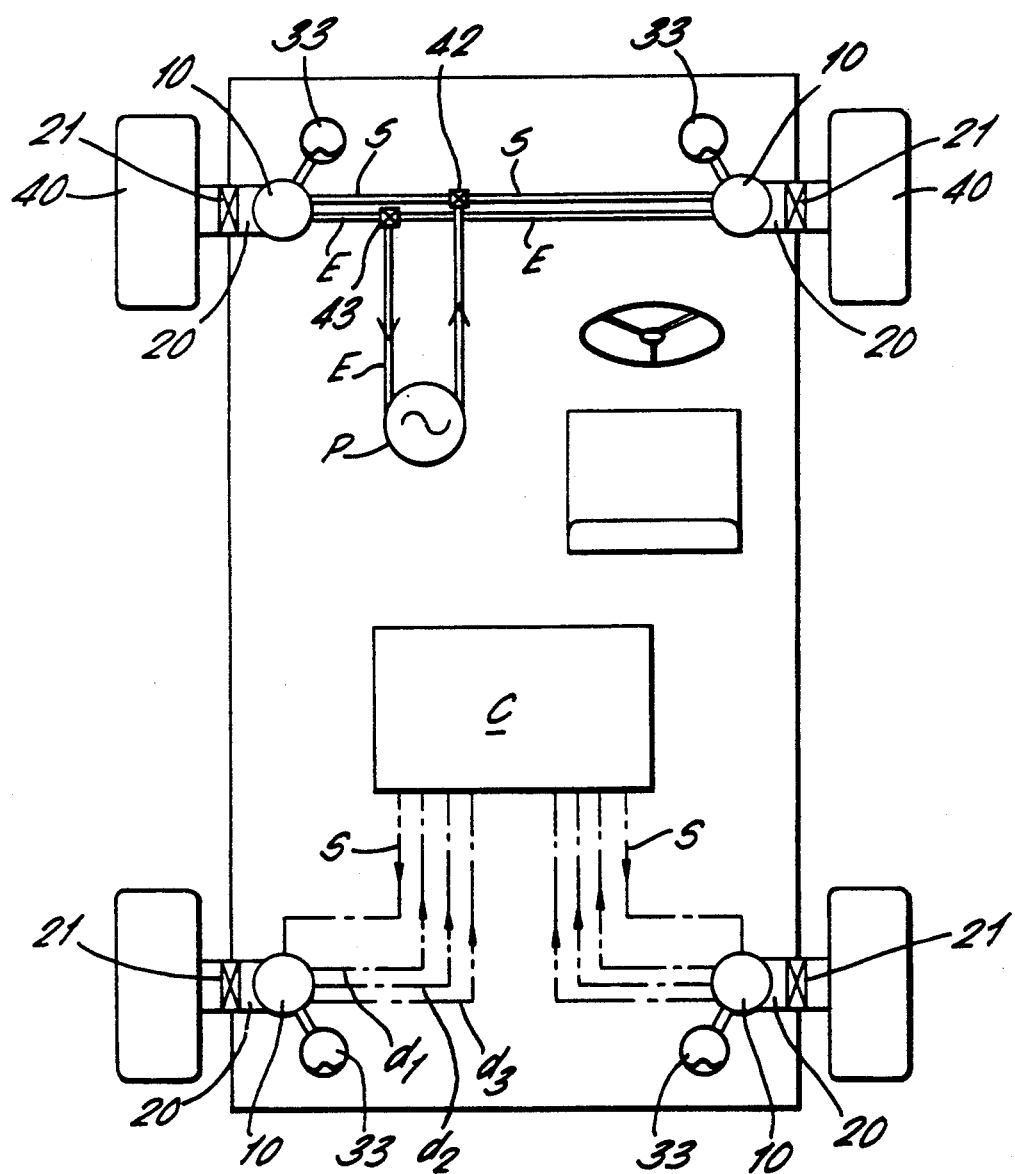
FIG. 2 is a schematic view of a vehicle incorporating the suspension system.

Referring to FIG. 2, hydraulic connections E, S, and the pump P are shown in relation to the front wheels of the vehicle, and the electronic connections from the detectors D1, D2, D3 to the computer C, and its control signals S, are shown in relation to the rear wheels. This is purely for clarity, it being clear that each suspension device has both hydraulic and electrical connections.

A single pump P is shown supplying the devices at wheels 40 and 41 of the vehicle via valves 42 and 43 in the supply and exhaust fluid passageways which isolate the fluid connections to the devices at wheels 40 and 41 from each other. Separate pumps and passageways could of course be provided for each wheel.

Each device at each wheel is shown with its own accumulator 33, but the devices could share accumulators, and even a single accumulator may be provided to which each of the devices is connected.

Thus, the suspenson device of the invention can be made smaller and more rapidly responsive than previous devices. Further, the hydraulic control components such as the pump P interconnecting the supply S and exhaust E can be made more compact due to the reduced energy requirements.

From a test of the system, it is apparent that the unequal area actuator system as described consumes considerably less energy than a standard control system. Energy consumption of a trial system was only slightly higher than the conventional equal area actuator bypass system.

In summary, the unequal area actuator system of the invention exhibited comparable step response characteristics to both the standard active control system and a conventional equal area system. The effects of actuator friction were not included in the model, as well as any isolator damping or stiffness, all of which will contribute to errors in the calculation of internal pressure. Furthermore, for these simulations, system pressure variation was ignored.

Figure 3:
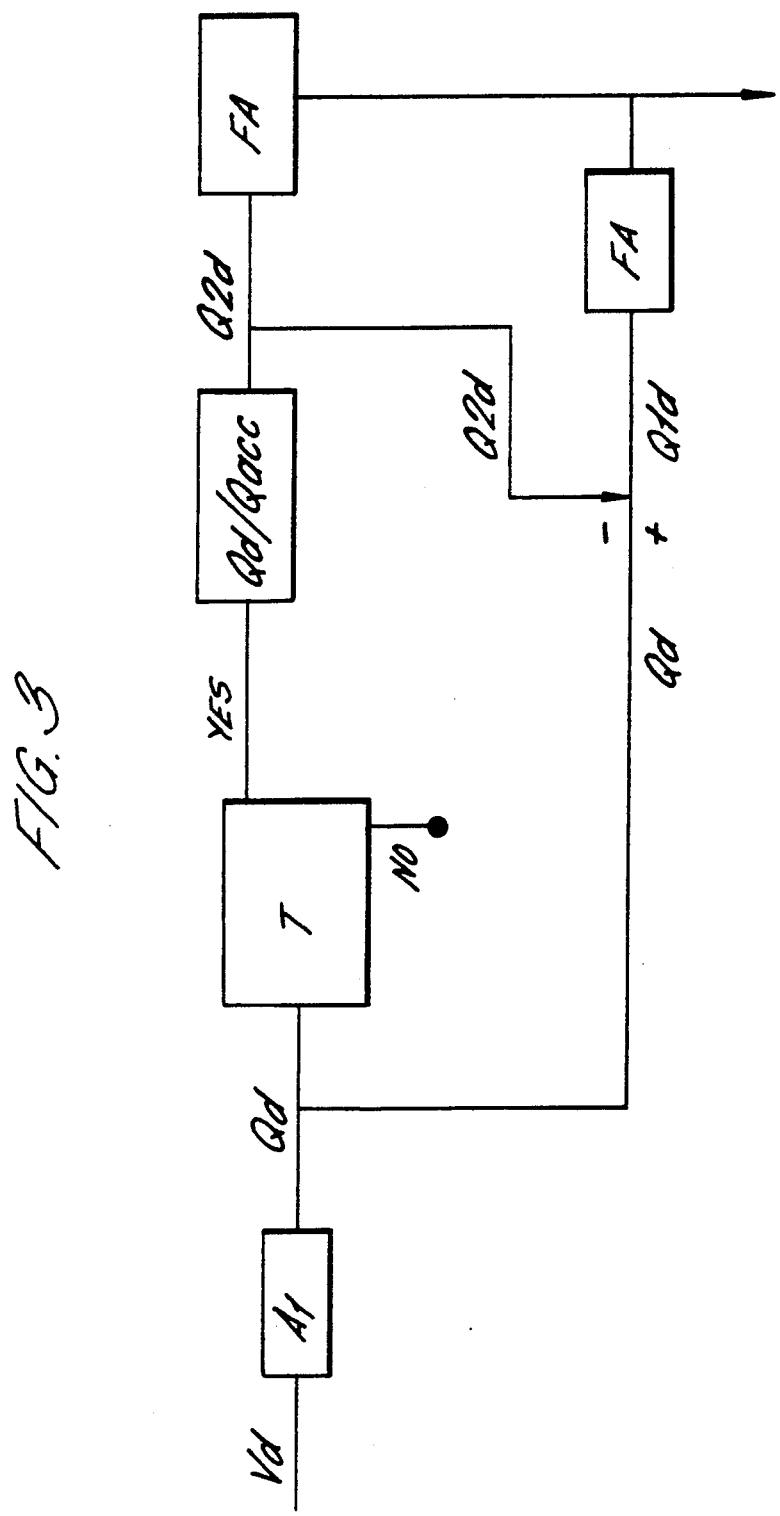
FIG. 3 shows an operational flow chart for the suspension system.
Figure 4:
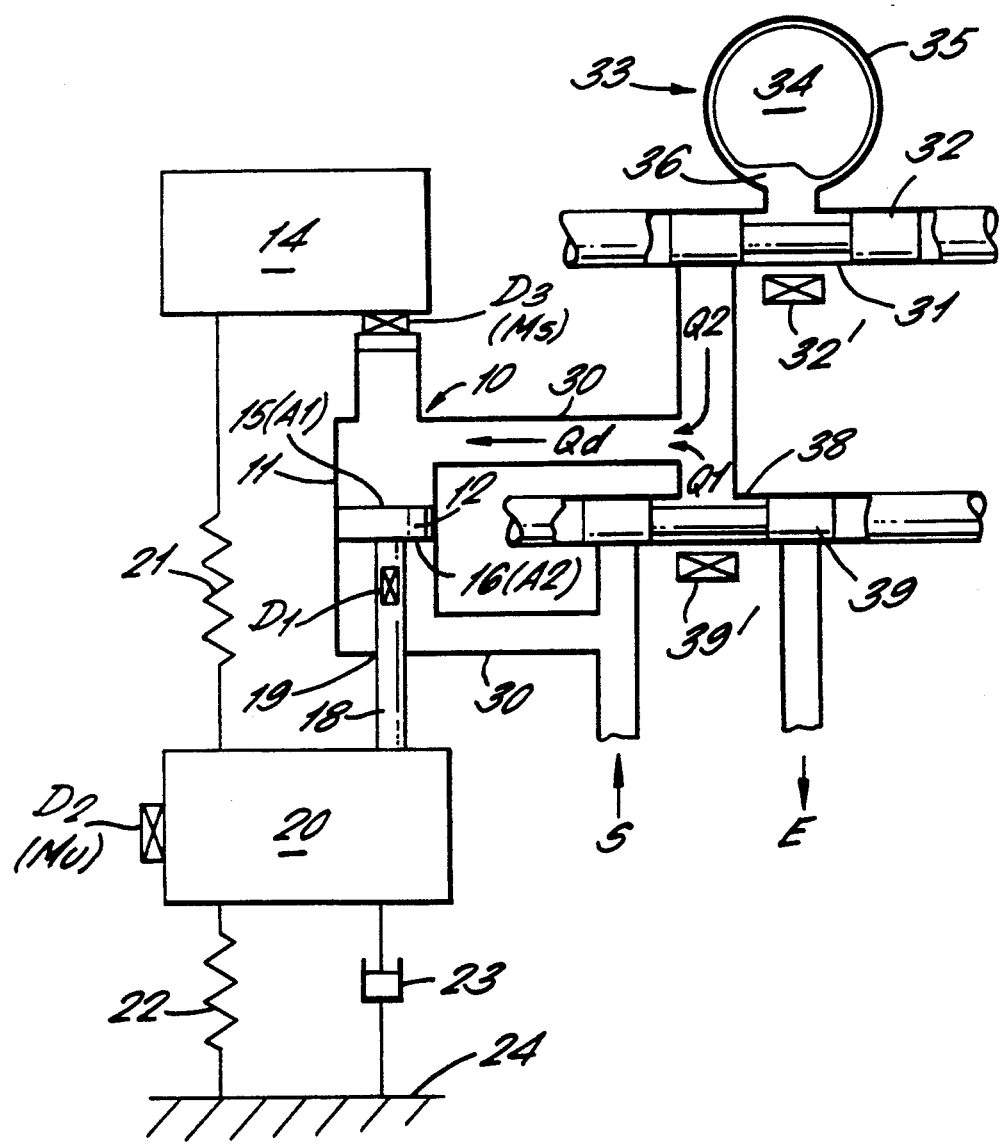
FIG. 4 shows a view similar to FIG. 1, but with the parameters and variables of FIG. 3 marked on it.

FIGS. 3 and 4 illustrate an operational algorithm for one embodiment of the invention.

A fluid velocity demand Vd for the piston and cylinder device 10 is calculated by the computer C. Signals are fed to the computer from the wheel hub, the piston, and the body of the vehicle to enable Vd to be calculated. For example, the force on the body supported by the device, the relative positions of the sprung and unsprung masses Ms and Mu, and any other appropriate signals. The actual value of Vd will depend upon how the system is designed to respond to inputs and is not central to the present invention.

The fluid velocity demand Vd is then combined with the area Al above the piston to give a quantity demand Qd representing the demanded quantity of fluid which it is required should flow to the piston 12.

The computer C also ascertains from d1, d2, d3, (or the relative pressures in passages 30 above and below the piston 12) whether the load between the sprung and unsprung masses is aiding movement of the piston in its desired direction. This test is represented as box T in FIG. 3. Following the upper line of the algorithm, if the load between the sprung and unsprung masses Ms and Mu is aiding the desired movement of the piston a calculation is then made to compare the quantity of fluid demanded Qd with the maximum quantity which can flow from the accumulator via the spool valve 31. Obviously, the supply from the accumulator can never exceed this figure and so the demanded quantity must be compared with it to see if more fluid is needed and an additional required quantity Q2 is calculated. The quantity demanded Qd is also fed through the lower half of the algorithm and is compared with the Q2 demanded (which is the quantity through the second spool 31) and only if Q2 is not sufficient for the Q demanded is an additional quantity Q1 required from fluid flowing through the first valve spool 38. Both required flow signals Q1 and Q2 then pass through a flow adjustment calculation FA to compensate for such things as the relative flows when both valves are open etc.

If the load between the sprung and unsprung masses Ms and Mu is not assisting the desired movement of the piston 12 the total Qd is provided by Q1 (Q2 being set to zero).

I claim:

1. A vehicle suspension device comprising a piston and cylinder arrangement included in a fluid control circuit, a first surface of the piston acting in a first chamber of the cylinder being of smaller area than a second surface of the piston acting in a second chamber of the cylinder, wherein said first chamber is connected via fluid connection means to a source of pressurized fluid and said second chamber is selectively connectable via fluid connection means to one or more of a source of pressurized fluid, an accumulator of pressurized fluid and an exhaust for pressurized fluid;

an actuator rod secured to said first surface of said piston extending longitudinally along the first chamber through an aperture in a wall thereof externally of the cylinder to interconnect the piston and an object supported on the suspension device, thereby forming the reduced area of the first surface of the piston in comparison with the second surface thereof;

said piston and cylinder arrangement interconnecting the sprung mass of a motor vehicle and a road wheel hub assembly thereof;

said fluid connecting means selectively interconnecting the second chamber of the cylinder;

one or more of a source of pressurized fluid, a compressible accumulator of pressurized fluid and an exhaust for pressurized fluid consisting of interconnecting pipework, a three-port, two-way valve selectively connecting either said source of pressurized fluid or said exhaust for pressurized fluid to said second chamber via a pipework intersection; and an on-off valve selectively connecting said compressible accumulator of pressurized fluid to said second chamber and the output port of said three-port, two-way valve via said pipework intersection.

2. A vehicle suspension device comprising:
(a) an actuator interconnected between the sprung mass of a vehicle and a vehicle hub, said actuator embodying a double acting piston and cylinder device for controlling the length of the actuator and in which a first smaller area lower face of the piston acts in a first lower cylinder chamber and a second larger upper area face of the piston acts in a second upper cylinder chamber;
(b) means connecting the first cylinder chamber permanently to a source of pressurized fluid during normal use;
(c) valve means connecting the second chamber selectively to an accumulator for storing pressurized fluid, an exhaust for pressurized fluid, and a source of pressurized fluid;

(d) a control device for controlling said valve means according to a desired vehicle suspension control program;

(e) means to detect the sense of the forces acting on the actuator (i.e., whether they act to lengthen or shorten the actuator) between the wheel hub and the sprung mass;

(f) said control device operable to activate the valve means to connect the second chamber solely to said accumulator the detector means indicates that the desired direction of movement of the actuator (i.e., lengthening or shortening) is in the same direction as the sense of said forces acting on the actuator.

3. A vehicle suspension as claimed in claim 2 wherein the control device is operable to activate the valve means to connect the second chamber to both the source of pressurized fluid and the accumulator of the pressurized fluid when the control device calculates that the desired flow of fluid to the suspension device cannot be supplied by the accumulator alone.

4. A vehicle suspension device as claimed in claim 2 wherein the valve means isolates the second chamber from the accumulator when concurrently the accumulator is charged to capacity and the relative motion of the sprung mass of the motor vehicle and the road wheel hub assembly towards one another is acting to assist the piston to attain a demanded position.

5. A vehicle suspension device is claimed in claim 2 wherein an actuator rod secured to said first surface of said piston extends longitudinally along the first chamber through an aperture in a wall thereof externally of the cylinder to interconnect the piston and the road wheel hub assembly device, thereby forming the reduced area of the first surface of the piston in comparison with the second surface thereof.

6. A vehicle suspension device as claimed in claim 2 wherein the valve means comprises a three-port, two-way valve selectively operable to connect either said source of pressurized fluid or said exhaust for pressurized fluid to said second chamber.

7. A vehicle suspension device as claimed in claim 2 wherein the source of pressurized fluid for the first chamber of the piston is common with the source of pressurized fluid for the second chamber of the piston.

8. A vehicle suspension as claimed in claim 2 wherein the accumulator for pressurized fluid comprises a pressurized deformable fluid reservoir disposed within a rigid container adapted to receive fluid from the second chamber of the piston deformation of the deformable fluid reservoir thereby being elastic under the influence of pressurized fluid from the second chamber when compressible accumulator is connected to it.

9. A vehicle suspension device as claimed in claim 2 wherein the exhaust for pressurized fluid is connected to the source of pressurized fluid via fluid pressurizing means, and the fluid control circuit is thereby formed as a closed circuit.

10. A vehicle suspension device comprising at least one vehicle suspension device as claimed in claim 2 wherein transducers and/or sensors are included for detecting the operating characteristics of the vehicle suspension device and for detecting the static and/or dynamic characteristics of the vehicle and in which the control device comprises an on-board computer for processing the detected characteristics and operating the vehicle suspension device accordingly.

* * * * *